UNITED STATES PATENT OFFICE.

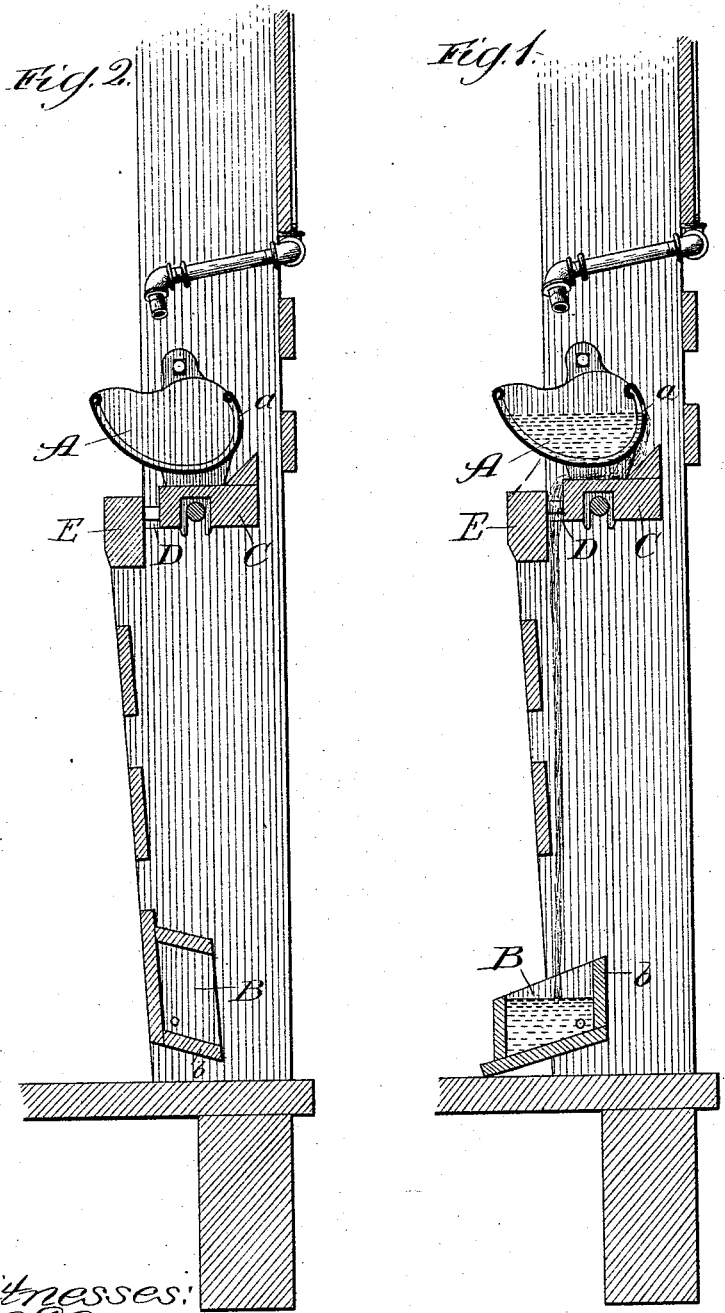

BOHN CHAPIN HICKS, OF CHICAGO, ILLINOIS, ASSIGNOR TO THE HICKS STOCK CAR COMPANY, OF WEST VIRGINIA.

STOCK-CAR.

SPECIFICATION forming part of Letters Patent No. 455,715, dated July 7, 1891.

Application filed December 15, 1890. Serial No. 374,728. (No model.)

*To all whom it may concern:*

Be it known that I, BOHN CHAPIN HICKS, a citizen of the United States, residing at Chicago, Cook county, Illinois, have invented a new and useful Improvement in Stock-Cars, of which the following is a specification.

The object of this invention is to provide a pivoted trough that when turned into a position of non-use shall form the lower slat of the car, and also to provide means whereby the water fed into the upper series of troughs shall also supply the lower series, thereby enabling one pipe to supply both series; and the invention consists in the features and details of construction hereinafter described and claimed.

In the drawings, Figure 1 is a vertical section of a portion of the side of a car with both series of troughs in position for use, and Fig. 2 is a similar section with the lower trough in position of non-use.

The upper series of troughs A are supported in any suitable manner at the side or between the side posts of the car, and are preferably provided with discharge-orifices $a$ in their sides or ends at any desired point. These orifices are of any desired size to carry off the overflow, as above described. Beneath this series of troughs, at a point near the floor of the car, is pivoted a second series of troughs B, adapted to be rocked when not in use into the position shown in Fig. 2. When in this position, they serve as side slats, filling in the space between the side posts near the floor and preventing the animals being carried from passing their legs, &c., out of the car. When rocked into position for use, the outer sides $b$ of the troughs are sufficiently high to fill this space and serve the same purpose.
At a suitable distance beneath the troughs A are rails or bars C, the upper faces of which are beveled, as shown, slanting downward and inward toward the floor of the car, and so constructed as to direct any water that may fall upon them toward the troughs B. Similar pieces D may, if desired, be placed between these beams and the adjacent slats E to aid in directing the water to the troughs B. If desired, the beams C may be omitted and a plank or board placed in a slanting position beneath the upper troughs, serving the same purpose—that of a chute—to direct the water from one set of troughs to the other.

The device operates as follows: When it is desired to water the stock, water is admitted to the upper troughs A from any suitable source through the pipe E or in any other suitable way. It rises in the troughs, and by the time they have been sufficiently filled the level of the water reaches the orifices $a$, out of which it flows, and falling upon the chute C is directed into the troughs B, thereby filling them and supplying water to the animals being transported upon the floor of the car.

By means of the construction above described the set of pipes required to supply the upper series of troughs serves to also supply the lower series, and thereby the construction of a car is greatly simplified and its cost correspondingly lessened, it having heretofore been considered necessary to provide an additional set of pipes to lead water to the lower troughs, which are now dispensed with entirely.

Instead of making orifices or holes through the troughs, a portion of the side or end may be cut away, allowing the water to escape when it reaches the lower end of the opening thus formed, and any other means for allowing the water to escape may be employed, as desired, and I use the word "orifice" as covering any of these forms.

There is this further advantage in dispensing with the lower water-pipe that it is thereby rendered easier to obtain access to the interior of the car when desired for any purpose, as for getting at stock to get them up when down, whereas if this pipe were used it would obstruct the space just above the lower trough, rendering it difficult to reach the animals to any advantage.

I claim—

1. Adjacent side posts of a stock-car and cross-slats extending between the same and preventing the animals within the car from gaining access to the space between said side posts and exterior to the slats, in combination with a bottom trough B, pivoted to and between said side posts near the floor of the car, the bottom of said trough (when said trough is tilted up to a position of non-use) constituting one of the slats extending between the side posts and thereby closing the trough-space, substantially as set forth.

2. An upper supply-trough A, supported between the roof and the floor of a car and provided with an overflow-orifice, and a lower trough B, located beneath said trough A, in combination with the upper slat E and a rail C, located beneath said trough A and a short distance from said slat E, the upper surface of said rail C being inclined, whereby the overflow from said overflow-orifice falls upon said rail C and is conducted thereby between said rail and said slat E and thence to said lower trough B, substantially as set forth.

BOHN CHAPIN HICKS.

Witnesses:
 THOMAS A. BANNING,
 ANNIE C. COURTENAY.